Aug. 11, 1925.

A. S. FITZ GERALD

1,549,478

APPARATUS FOR THE PROTECTION OF ALTERNATING ELECTRIC CURRENT SYSTEMS

Filed July 19, 1923    6 Sheets-Sheet 1

INVENTOR

Alan Stewart FitzGerald

Aug. 11, 1925. 1,549,478
A. S. FITZ GERALD
APPARATUS FOR THE PROTECTION OF ALTERNATING ELECTRIC CURRENT SYSTEMS
Filed July 19, 1923 6 Sheets-Sheet 2

INVENTOR
Alan Stewart FitzGerald

Aug. 11, 1925.  1,549,478
A. S. FITZ GERALD
APPARATUS FOR THE PROTECTION OF ALTERNATING ELECTRIC CURRENT SYSTEMS
Filed July 19, 1923   6 Sheets-Sheet 3

INVENTOR
Alan Stewart FitzGerald

Aug. 11, 1925.  
A. S. FITZ GERALD  
1,549,478  
APPARATUS FOR THE PROTECTION OF ALTERNATING ELECTRIC CURRENT SYSTEMS  
Filed July 19, 1923    6 Sheets-Sheet 4

INVENTOR  
Alan Stewart FitzGerald

Aug. 11, 1925. 1,549,478
A. S. FITZ GERALD
APPARATUS FOR THE PROTECTION OF ALTERNATING ELECTRIC CURRENT SYSTEMS
Filed July 19, 1923   6 Sheets-Sheet 6

Fig. 14.

INVENTOR

Patented Aug. 11, 1925.

1,549,478

UNITED STATES PATENT OFFICE.

ALAN STEWART FITZ GERALD, OF FINCHLEY, ENGLAND, ASSIGNOR TO GENERAL ELECTRIC COMPANY, A CORPORATION OF NEW YORK.

APPARATUS FOR THE PROTECTION OF ALTERNATING-ELECTRIC CURRENT SYSTEMS.

Application filed July 19, 1923. Serial No. 652,578.

*To all whom it may concern:*

Be it known that I, ALAN STEWART FITZ GERALD, a subject of the King of Great Britain, residing at Finchley, in the county of Middlesex, England, have invented certain new and useful Improvements in and Relating to Apparatus for the Protection of Alternating-Electric Current Systems, of which the following is a specification.

My invention relates to the protection or control of alternating electric current circuits wherein a relay or the like electro-responsive device is arranged to operate on negative power in the case of a single circuit or on relative distribution of power in the case of two or more circuits connected in parallel.

The object of my invention is to avoid the use of relays of the type having fixed and moving coils, dynamometer and other differential relays and to substitute simple relays or other electro-responsive devices of the attracted armature pattern.

According to my invention, I balance the various effects in one or more static electric or biasing transformers which are in general similar to those disclosed in my Letters Patent 1,468,441 of the United States for protective device for electric distribution systems, issued September 18, 1923, and my copending application Serial No. 652,276 for alternating electric current protective apparatus, filed July 18, 1923, both assigned to the same assignee as this invention. For this purpose, I employ novel circuit arrangements in the protective system and novel relations of the windings of the biasing transformers with respect to the magnetic circuit so that the secondary current of the biasing transformer which controls the relay or the like is related in phase with but not in magnitude with the primary exciting current. Operation of the relay may be arranged to take place in accordance with any predetermined vectorial relationship between current in the circuit (in the case of a single circuit where an indication or disconnection of the circuit is required when the power reverses in direction) and any predetermined potential difference associated with the circuit and used as a coordinate in the comparison.

In the case of parallel circuits, an indication or disconnection of a circuit may be desired when the normal distribution of power is disturbed by a fault to earth or between phases or other abnormal condition. The abnormal condition may not cause absolute reversal of power in any circuit but if it causes any circuit to take more or less than its proper normal share of the load, an indication or disconnection of said circuit may be effected by my invention.

In all cases, the resultant current controlling the relay or the like is derived from biasing transformers.

My invention will be more readily understood by reference to the accompanying drawings in which.

Figure 1:
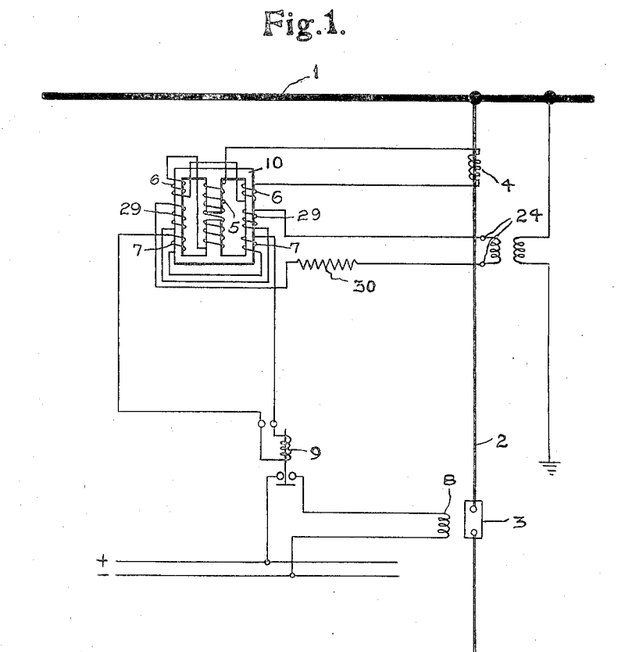
Figures 1, 2, 3, 8, 11, 12, 13 and 14 are working circuit arrangements illustrated by way of example.

In Figure 1, a bus-bar 1 is shown supplying power to or receiving power from a feeder 2. The circuit is provided with a switch or circuit breaker 3 and a current transformer 4. The current transformer 4 is connected to a biasing transformer comprising a magnetic core 10 on which are wound a restraining winding 5, an operating winding 6, an auxiliary operating winding 29 and a secondary winding 7. The operating windings 6 and 29 are connected to receive operating currents and the secondary winding 7 is inductively related to both of the operating windings but the restraining winding 5 is so arranged as to produce substantially no electromotive force at the terminals of the windings 6, 29 and 7, and is adapted to receive current which regulates the fluxes set up by the operating windings in response to any given operating currents. For simplicity in the subsequent figures, a schematic showing of the biasing transformers has been adopted, the restraining windings being drawn horizontally and the operating and secondary windings being drawn vertically. In Figure 1, the restraining winding 5 and operating winding 6 are connected in series with the secondary of a current transformer 4. The secondary winding 7 of the biasing transformer is connected to a simple relay 9 adapted on operation to close the circuit of the tripping device 8 and open the circuit breaker 3. The tripping device 8 is supplied from any suitable source, for example, a source of continuous current potential as shown.

Figure 5:
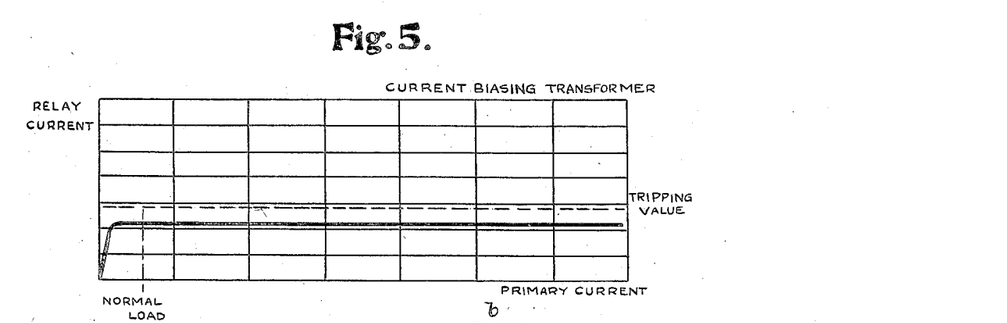

At terminals 24 there is arranged to be available a source of alternating current potential difference derived directly or by transformation from that due to which current flows in primary conductor 2. In this case, a potential transformer is connected between the bus-bar and earth. On the biasing transformer there is provided an additional operating winding 29 excited in series with a non-inductive resistance 30 from terminals 24. The resistance 30 is arranged to be large in comparison with the reactance of the operating winding 29 so that the current in this operating winding will be very approximately in phase with the potential difference available at terminals 24. The connections are, therefore, so arranged that with reverse power in the conductor 2 and unity power factor, the exciting ampere-turns in windings 6 and 29 will be additive. Correspondingly with forward power, the biasing transformer will only be excited by the difference between said excitations. The current in winding 29 due to the potential may be considered to be constant. On the other hand, the current in restraining winding 5 and operating winding 6 being proportional to the current in the primary conductor 2 will be a variable. The operation of the biasing transformer is as follows:—It is found that if the operating and restraining windings of the biasing transformer of the pattern having a central air-gap are connected in series and that if suitable ampere turns be adopted, then the current in the secondary winding being connected to a suitable relay may be maintained at an approximately constant value when the current flowing in the operating and restraining windings varies over a wide range. It will be seen, therefore, that if the winding 29 be not excited due to potential, current will be found in the relay 9 due to current excitation, this current remaining substantially constant with large fluctuations of current in the feeder 2. In Figure 5, I show the relation between relay current and primary current. The relay current will be seen to be approximately constant from small fractions of normal load up to the maximum possible overload. On the other hand, the excitation due to winding 29 will remain substantially constant, the potential difference from which it is supplied being considered substantially constant. Therefore, if both operating windings are energized, current will flow in the secondary winding 7 and relay 9 in accordance with the vectorial relation between the potential and current and as above described connections may be so disposed that the electromotive forces influencing the winding 7, due to excitation of windings 6 and 29, are in opposition when the direction of power is positive and in addition when the direction of power is negative, the relay 9 being actuated in the latter case. According to a further modification, however, I arrange my circuit as shown in Figure 2.

Figure 2:
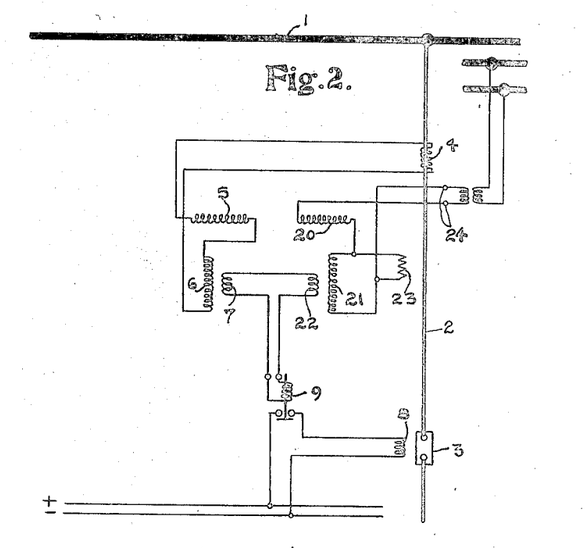

In Figure 2, a source of alternating current potential difference is available at the terminals 24 this potential difference may be derived either directly or by transformation from such points on the system that it is in the quadrature with the potential difference causing current to flow in the conductor 2. This arrangement, as is well known, gives superior operation under abnormal conditions because of combining with the current most affected by a fault, the potential least affected by the fault. The secondary winding of the current transformer 4 is connected to a biasing transformer 5, 6, 7, which is thus energized in accordance with the current derived from the current transformer 4. Another biasing transformer 20, 21, 22, is energized from the potential terminals 24 receiving energy from a potential transformer connected between the other two phases of the system when the system is three-phase or in general in quadrature to that potential due to which current flows in conductor 2. In each case 5 and 20 respectively are the restraining windings and 6 and 21 the operating windings, the operating and restraining windings being connected in series and in a like manner in both cases.

The secondary windings 22 and 7 of both biasing transformers are connected in series with the relay 9.

Figure 3:
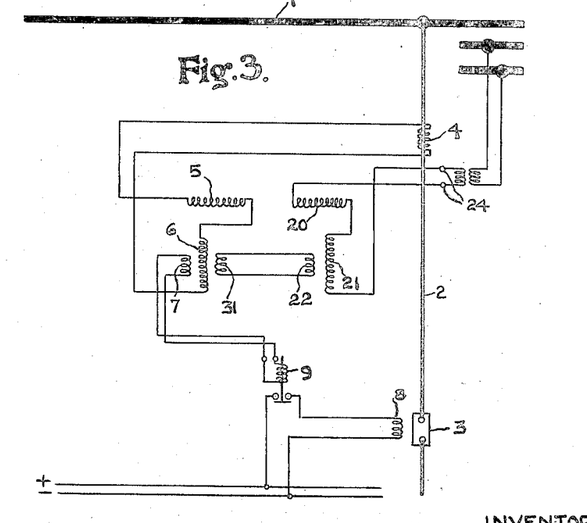

Alternatively as shown in Figure 3, I may excite an additional operating winding 31 by winding 22 or I may invert this latter arrangement by connecting winding 22 directly to the relay and providing an additional winding similar to 21, excited directly or indirectly by current.

The operation of this modification of my invention is as follows:—

It is found that if the operating and restraining windings of a biasing transformer of the pattern having a central air-gap be connected in series and that if a suitable ratio of operating to restraining ampere turns be adopted that the current in the secondary winding, this being connected to a suitable relay, may be maintained at an approximately constant value, when the current flowing in the operating and restraining windings varies over a wide range. Therefore, if the biasing transformer connected directly to the current transformer 4 be not excited, current will be found in the relay 9, due to the potential difference at the terminals 24, and this current will remain approximately constant for wide variations in the line voltage.

Figure 4:
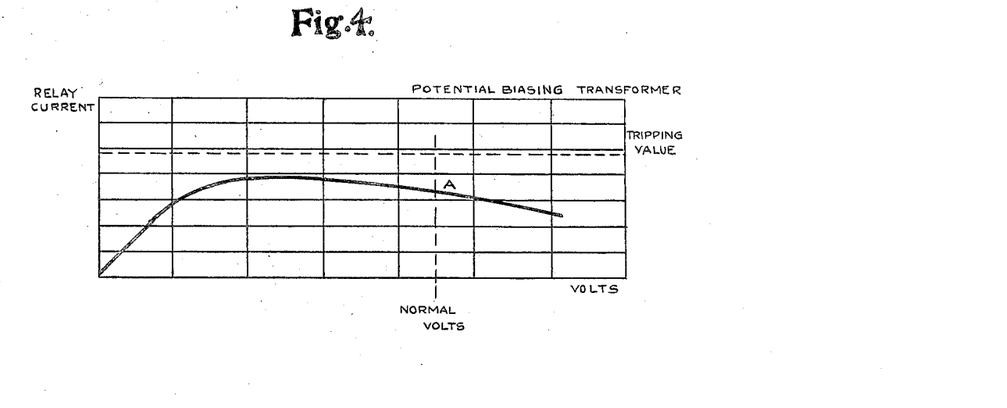
Figures 4, 5, 6, 7, 9 and 10 are explanatory curves

In Figure 4, I show a characteristic curve for such a biasing transformer, in which I have incorporated further advantageous characteristics. By suitable design of the biasing transformer, I may arrange that the current in the secondary winding instead of remaining constant may be caused to be in accordance with the curve shown. I have shown a point A on the curve, this representing the point on the curve which I would recommend to correspond to normal operating volts.

It will be seen that under surge effects likely to give rise to instantaneous rise of potential, the relay current will become slightly decreased, thereby rendering the apparatus less liable to incorrect operation under such conditions.

On the other hand, under short circuit conditions due to which there may be a considerable reduction in the line volts, it is possible to provide that the current in the relay rather than suffering the corresponding decrease, may become slightly increased before finally falling to zero. It will be seen that at half normal volts I have a slight increase in the secondary current due to the potential, and therefore, I shall get more decisive operation under conditions of reduced volts. Again, assuming the potential windings 20 and 21 (Figures 2 and 3) not to be excited, current will flow in the relay 9 due to excitation of windings 5 and 6 of the current biasing transformer should current be flowing in the primary conductor 2. This current is also arranged to be approximately constant from small fractions of normal load up to the maximum possible overload. Such a characteristic curve is given in Figure 5. The characteristics of the biasing transformer excited by current, may, if desired, be arranged similar to that given in Figure 4, that is to say, the value of secondary current may be arranged to fall off with increased primary current so that under very heavy short circuit conditions it may become inoperative should this be required. It will be seen, therefore, that if both biasing transformers are energized current will flow in the secondary windings 7 and 22 and therefore in the relay 9, in accordance with the vectorial relation between the potential and current, and connections may be so disposed that the electromotive forces in windings 7 and 22 are in opposition when the direction of power is positive, and in addition when the direction of power is negative, the relay 9 being actuated in the latter circumstance.

Because of the advantages that accrue when the potential connections are taken off points in the circuit such that the potential is in quadrature with the potential due to which current flows in the conductor 1, it is preferable to provide that the electromotive force appearing in the secondary circuit due to the biasing transformer excited by the potential, shall at unity power factor, have no vectorial displacement from the current in the conductor 1. The restraining winding 20 having a very high reactance in comparison with the operating winding 21 and having no inductive relation therewith, it is found that the current flowing in the operating winding 21 and the electromotive force appearing in the secondary winding 22 will lag behind the exciting voltage derived from terminals 24, by an angle slightly less than 90°, this being due to iron and copper losses in the biasing transformer. In order to provide a device whose operation shall be accurately related to the vectorial displacement between the current and potential, I provide in Figure 2 a resistance 23, connected across the terminals of the operating winding 21 so that the resultant voltage appearing in the circuit 7, in which is connected the relay 9, is caused to be again displaced by precisely that amount due to the error introduced by the iron and copper losses. This electromotive force, therefore, will be in quadrature with the potential derived from terminals 24. In Figure 3, the resistance 23 is not required as the required vectorial displacement is obtained by the reactance of winding 31.

Figure 6:
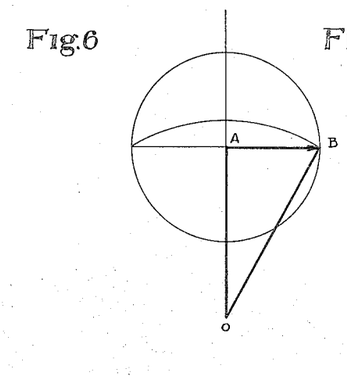

In Figure 6, I give a simple vector diagram illustrating operation as follows: Vector OA represents the value of the secondary current due to the potential across the terminals 24. Assuming no change in the line voltage, this may be regarded as of constant magnitude and position. OB represents a radius of a length corresponding to the current value at which the relay 9 is set to operate. Obviously, then AB represents the value of the current set up in the secondary circuit due to the primary current, when the relay is on the point of tripping. By so designing the apparatus that the magnitudes are roughly in accordance with the diagram, it will be seen that tripping of the relay will be achieved as in Figure 7, that is to say, over 180° of arc representing negative power.

Figure 8:
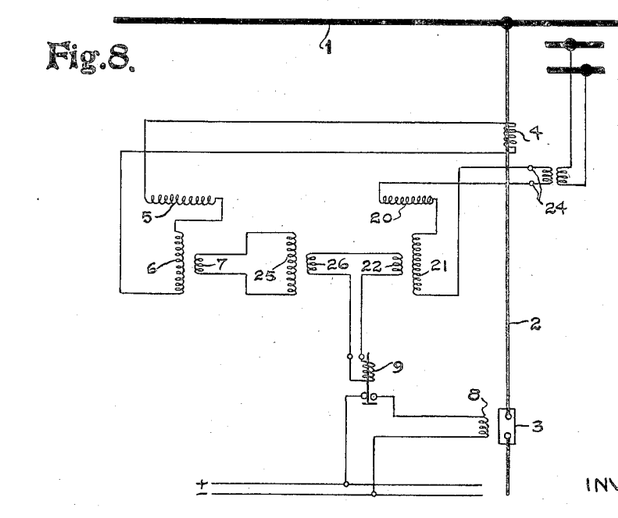

An arrangement having still further advantages may be arrived at by apparatus as in Figure 8 in which I show the biasing transformer excited by potential as comprising windings 20, 21 and 22 but having no resistance 23. Instead, however, of connecting secondary winding 7 directly to secondary winding 22 and relay 9, I connect the winding 7 to the primary winding 25 of another auxiliary transformer, in which, however, there may be no restraining element present. The secondary winding 26 of this latter transformer I connect as heretofore to secondary winding 22 and relay 9.

The operation of this arrangement is exactly in accordance with that previously described, with the following modifications.

The additional transformation associated with windings 25 and 26 fulfills the same object as the resistance 23 shown in Figure 2, in that the angular displacement due to transformation between windings 25 and 26 is in such a direction as to compensate for the displacement between the voltage applied to the terminals 24 and the quadrature current in the winding 22 which, as has been previously explained, is due to the losses in the potential biasing transformer. In addition, however, by suitably designing windings 25 and 26 these may be given such a resistance as to give rise to copper losses having the following object.

Figure 7:
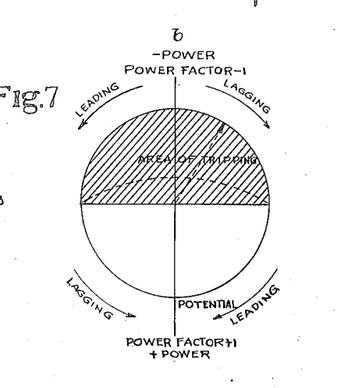
Figures 9, 10:
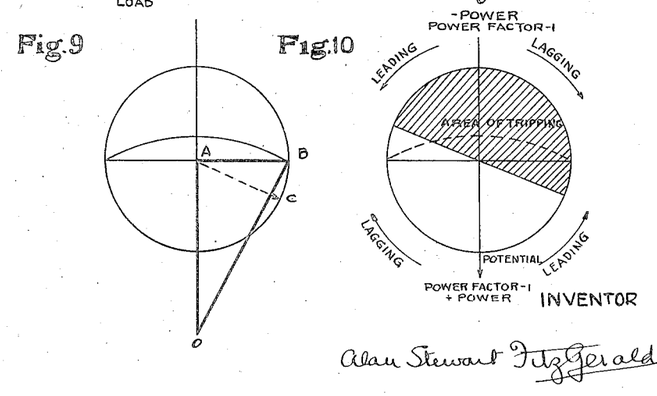

Under conditions of normal load, the phase displacement due to transformation between windings 25 and 26 may be such as to give tripping conditions in accordance with Figure 7. Under conditions of overload, however, due to saturation of the iron cores, it is found that the ratio of resistance to reactance in the circuits associated with windings 25 and 26 will become augmented. This will give rise to a still greater phase displacement due to transformation between windings 25 and 26, such that under conditions of overload the tripping characteristics instead of being in accordance with Figure 7 will be in accordance with Figure 9.

The advantages accruing from this arrangement are as follows:—

Existing practice, having regard to the fact that all heavy short-circuit effects will necessarily be associated with low power factor lagging currents, favours connection of the potential supply in such a manner that the axis of tripping becomes displaced in favour of reactive faults. In my present invention, it is shown that by designing the apparatus in accordance with Figure 9 a symmetrical axis of trip is given under normal loads but that under heavy overloads the above effect is brought about.

It will be realized that the angular difference between lagging currents having a forward power component and those having a negative power component may not be more than a few degrees, and that with apparatus arranged to trip over a symmetrical angular displacement from unity power factor will necessarily require to operate with a considerable degree of precision in order to prove effective. According to my present invention, however, having characteristics in accordance with the arrangement shown in Figures 8 and 10 there will be no tendency to trip on the occurrence of very heavy lagging currents associated with forward power. Since, however, a symmetrical tripping is provided under conditions not associated with heavy overload, there will be no tendency to trip due to charging currents or other leading currents of lower power factor such as may happen with synchronous machinery.

Having shown how the biasing transformer may be applied to provide a means of giving reverse power protection, I now show how it may be applied to differential or comparative reverse power protection for parallel circuits.

Figure 11:
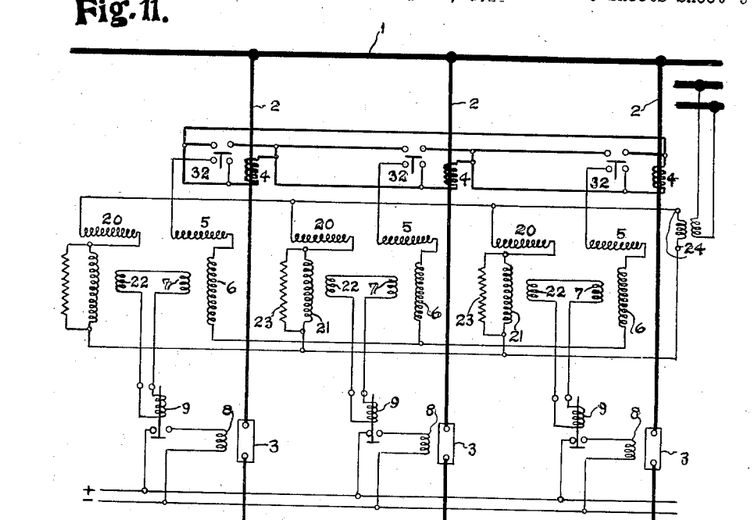

Figure 11, illustrates one method, this being a single phase diagram representing an arrangement comprising parallel feeders 2 connected to a common bus-bar 1 and provided with current transformers 4 of equal ratio, should the feeders 2 normally carry equivalent currents, or alternatively having such ratio that their secondary currents are equivalent when their primaries are carrying normally divided load. In this arrangement, I connect current transformers 4 in such a manner that current normally circulates between them and I connect between equi-potential points on the circulating current circuit, biasing transformers having an operating winding 6 in series with a restraining winding 5. The secondary winding 7 is connected in series with relay 9 and secondary winding 22 of the biasing transformer excited by potential as described, in connection with the previous figures.

It may be seen on reference to Figure 11 that under conditions in which all of the feeders 2 are healthy and are accordingly carrying normally divided currents, current will circulate in the secondaries of the current transformers 4 but will not flow in windings 5 and 6, and accordingly there will be no current in relay 9 except that due to the potential excitation which, in accordance with the operation described previously, cannot give rise to operation of the relay under any conditions. The operation of the embodiment of my invention shown in Figure 11 will be described on the basis that only two parallel feeders are in service and that a fault occurs on one of them, this being the operating condition for which this particular class of protective apparatus is more especially designed. On the occurrence of a fault on one of the two feeders 2, the following conditions will arise, it being supposed that bus bar 1 receives energy from no source of supply other than the two feeders 2. If it be assumed that on the occurrence of the fault there is no load connected to bus bar 1 and accordingly that there is no previous current in conductors 2, then the fault will be fed to some extent directly from the source of supply not shown in Figure 11, and to a further extent it will be fed through the sound feeder via bus bar 1. Under these conditions the current in the sound feeder 2 will represent forward or positive power and the current in the faulty feeder will represent reverse or negative power. Consequently the currents in the two feeders will be equivalent in magnitude but their vector quantities will be opposite. Accordingly, current will be found under these conditions in windings 5 and 6 which, being connected according to the diagram, will represent the difference between the currents in the feeders. These being of the opposite sense, the vectorial difference current will be equal to the arithmetical sum. Therefore, the difference current flowing in the operating winding in the directionally discriminating apparatus which comprises windings 5, 6, 7, 20, 21, 22, etc., will have such phase relation as represents negative difference power on the faulty feeder and positive difference power on the healthy feeder, due to which the relay 9 associated with the faulty will be actuated.

If consideration be given to the occurrence of a fault when there is a load connected to bus bar 1, it will be seen that the currents in the two feeders will be made up of equivalent load components, superimposed on which there will be in the sound feeder a current having a forward power component equal to that portion of the fault which is fed through bus bar 1. Correspondingly, in the faulty feeder there will be superimposed on the load current an equivalent fault current representing, however, negative power. Should the nature of the fault be such as to give rise to a limited current only, as for instance, an earth fault on a system having a neutral earthing resistance, it is possible that the magnitude of the fault current which is fed through the sound feeder via bus bar 1 may be of the same order of magnitude as the load current, due to which the magnitude of the current in the sound conductor 2 may be greater than that in the faulty conductor 2, that is the resultant current in the faulty feeder is not reversed. Under these conditions, however, the difference current only will appear in the directionally discriminating circuit and operation with regard to the latter will be precisely as if there were no load on the feeder. Such an arrangement would be equally adaptable for the protection of a plurality of parallel feeders when the connections would be extended in accordance with Figure 11.

It has been explained that under conditions in which both conductors 2 are healthy, no current will be found in the operating circuits comprising the windings 5 and 6.

Upon the occurrence of severe short circuits on other portions of the network of which conductors 2 form a part, small difference currents may appear, due to lack of balance between current transformers or the impedance of the conductors themselves. If it is desired that operation of the gear under fault conditions be of a sensitive nature, it is desirable to preclude tripping of the protective gear due to such small difference currents occurring under conditions of excessive overload. Accordingly, therefore, I show in Figure 12 an arrangement comprising apparatus functioning after the manner described with reference to Figures 1, 2 and 3, and adapted to provide overload restraint as described in my application hereinbefore referred to.

Figure 12:
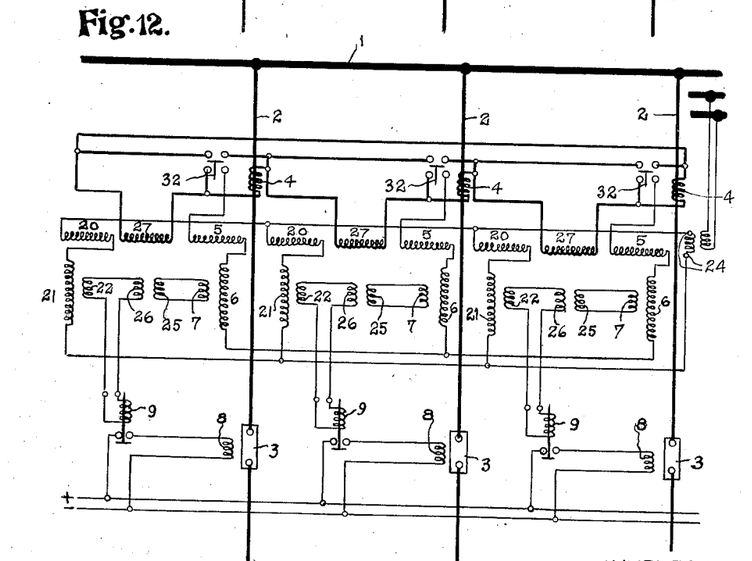

In Figure 12, I show an arrangement adapted to protect a plurality of feeders. This arrangement, it is to be understood is adapted to the protection of two or more feeders.

With the provision of such overload restraint, it is desired that the difference current necessary to operate the protective gear shall become augmented with increase of load on the feeder protected.

In Figure 12, therefore, I provide an additional biasing transformer unit having an operating winding 25 and a secondary winding 26. With this, I shall, at the same time, have the advantages which are fully described in connection with previous figures. On the biasing transformer having operating and secondary windings 25 and 26, I provide a restraining winding 27 connected in the circulating current circuit as shown, so as to be excited in series with the current transformer on the adjacent conductor.

The biasing transformer associated with windings 25, 26 and 27 is arranged to have characteristics, after the manner previously described by me in connection with such apparatus as to provide that its restraining effect shall be negligible under conditions of normal load. This can be done by providing an air gap in the magnetic circuit of the restraining winding. On the occurrence, however, of severe short circuits on remote portions of the network, the conductors 2, although sound, may carry abnormally heavy currents, and secondary currents of corresponding magnitude will flow in the restraining winding 27. The effect of this increased restraint will be such as to reduce the sensitivity of the apparatus under these conditions and accordingly such small difference currents as may be found in the operating windings 6 and 25 due to discrepancies of balance will be ineffective.

Further advantageous characteristics, however, may be provided by apparatus in accordance with Figure 12. It has been pointed out that conditions necessitating the application of protective gear of this nature are those associated with the supply of energy to a substation having in itself no source of power by means of two parallel feeders. Such apparatus may, however, be installed for the protection at a substation of a larger number of feeders than two, this being desirable due to the fact that there may be conditions under which any two feeders only may be in service. It will be seen that for the protection of such an increased number of feeders the conditions will not essentially call for protective gear having directional features since it is possible to provide for such conditions by apparatus functioning on current balance. Nevertheless, due to the fact that under certain conditions of service any two only of the feeders may be in commission, it is frequently desirable to provide on all the feeders, such protective gear as is described in the present invention.

There have been referred to above, circumstances accompanying the occurrence of a fault of a magnitude of the same order as that of the load current flowing when faulty feeders may carry currents no greater than those in healthy ones, and it is due to this consideration that balanced current protective gear cannot be employed. If, on the other hand, consideration be given to the nature of the flow of current attending the occurrence of severe short circuits, it will be realized that under these conditions, that is to say, with a number of feeders greater than two, the faulty feeder will invariably carry greater current than any other conductor.

Again, the installation of apparatus of the nature specified in the present invention may be applied to the protection of feeders entering a substation, which under various conditions of working may either receive or supply power. In the latter circumstance again, even if there are only two feeders, the faulty feeder will invariably carry the greater current. Due to this circumstance it may prove desirable, if the apparatus described in Figure 12 be designed to have the following characteristics which may be obtained by providing a suitable number of turns on the restraining winding 27.

It will be seen on reference to Figure 12 that with only two feeders in use at a receiving substation and with a heavy fault on one feeder, the current in the operating and restraining windings 6 and 5 will be as previously explained, the arithmetical sum of the currents in the two current transformer secondaries. Therefore, the current in the operating winding 6 will be substantially twice the current in the restraining winding 27. Accordingly, therefore, I arrange that under these conditions only I arrive at the characteristics indicated in Figure 5. Under every other possible condition associated with severe faults, there will be found in healthy feeders a ratio of operating to restraining ampere turns less than two and in all faulty feeders a corresponding ratio greater than two. Under these latter conditions, therefore, I shall find on referring now to Figure 7, that the area of tripping of healthy feeders will become less than 180° and of faulty feeders will become more than 180° and that under sufficiently severe fault conditions in which complete extinction of potential is given rise to, there will still be achieved correct tripping of the faulty feeder due to the fact that the tripping area of a faulty feeder embraces the whole of the 360° of potential, which will be seen to provide tripping even if the potential be not present. Correspondingly the tripping area of healthy feeders under the same condition will disappear entirely which results in it being impossible for a trip to occur with any phase relation of current to potential even should the potential be completely sustained.

Referring again to Figures 11 and 12 it will be seen that I have provided auxiliary switches 32 mechanically related to the oil circuit breakers so that when the oil circuit breakers are closed the auxiliary switches bridge the lower set of contacts and open the upper set of contacts. With the circuit breakers open, however, the converse holds good.

In order to take care of the usual operating conditions associated with parallel feeder protection it is desirable that the upper set of contacts be closed prior to the parting of the contacts of the circuit breaker on the opening stroke and the establishment of contact on the closing stroke. It is further desirable to arrange for the opening of the lower set of contacts to take place subsequent to the parting of the contacts on the opening stroke and inversely on closing. By this means on the opening of any of the circuit breakers whereby one of the feeders ceases to be in service, all the features referred to in the present invention are provided on the remainder and at the same time incorrect energization of the relays 9 during movement of the oil switches is entirely precluded.

It frequently occurs in the application of protective gear involving potential excitation that it is desirable to reduce to a minimum the energy consumption from this source. For this purpose I have shown in Figure 13 an arrangement suitable for two feeders only but adapted to provide all the features hereinbefore attributed to the present invention when applying to a plurality of feeders. I have, however, provided for the use of only one potential biasing transformer with a view to the requirements indicated above. The operation is in every way similar to that occurring with the previous arrangement except that I have found it preferable to adopt the form of connections shown, in which, instead of connecting the secondary winding 22 in series with the relay, I excite two additional operating windings 28 on each overload biasing transformer.

It will be noted that some biasing transformers in this specification are used in which the flux regulation effected by the restraining winding causes a constant or diminishing secondary current over a wide range of varying values of primary or operating current magnitude. This is different from other cases where the current in the restraining windings is used to bias the relay against operation on overload or to discriminate between two effects. The biasing or regulating transformer by adjustment of winding turns and air-gap can be arranged to give a wide range of different operating characteristics to meet different conditions.

Various forms of biasing transformer may be used in carrying the invention into effect. More particular description of these various forms is given in my application and Letters Patent hereinbefore referred to.

Figure 13:
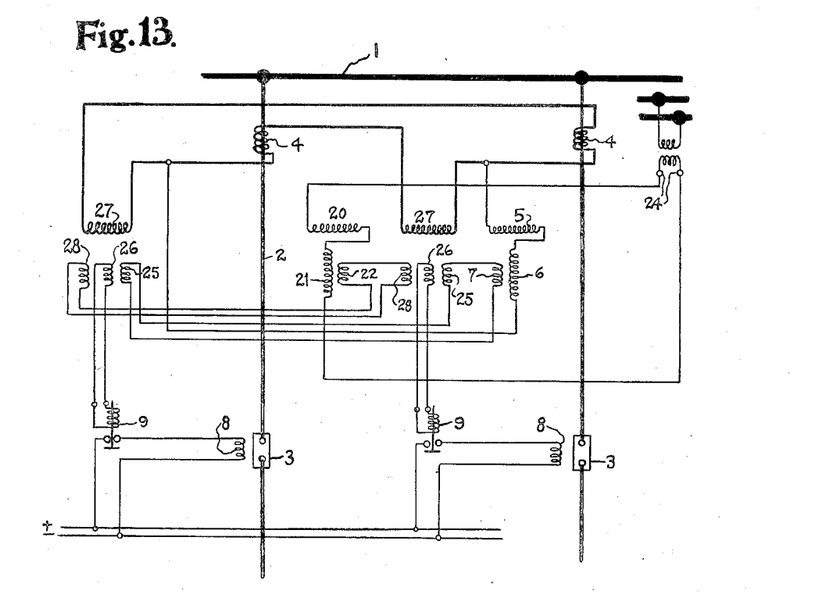
Figure 14:
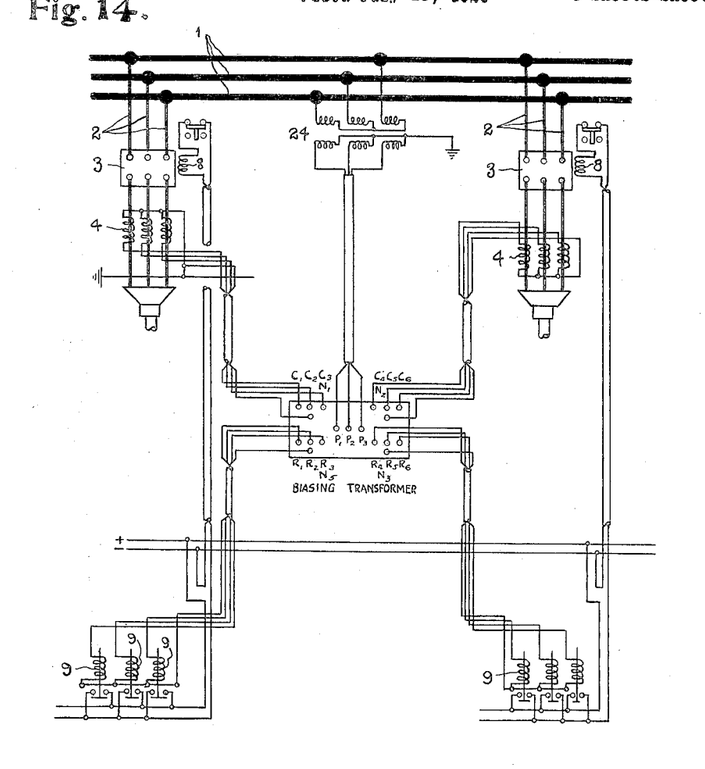

Figure 14 is a practical wiring diagram corresponding to Figure 13 and bearing the same reference numerals so far as corresponding elements are shown in the two figures. The biasing transformer windings are not shown since these windings on their respective cores are contained in the transformer tank shown which may be filled with insulating oil or compound. The connections to the various windings are made at the terminals $C_1$, $C_2$, $C_3$, $C_4$, $C_5$, $C_6$, $N_1$, $N_2$, $P_1$, $P_2$, $P_3$, $R_1$, $R_2$, $R_3$, $R_4$, $R_5$, $R_6$, $N_3$, $N_4$. It will be seen that the installation of this type of protective gear introduces a minimum of complicated wiring.

What I claim as new and desire to secure by Letters Patent of the United States, is:—

1. An alternating electric current circuit protective system in which operation of electro-responsive protective apparatus is effected by means comprising a biasing transformer in accordance with any predetermined phase relationship between current in the protected circuit and any predetermined potential difference related to said circuit.

2. An alternating electric current circuit protective system in which operation of an electro-responsive device is effected by biasing transformers excited in accordance with the current in the protected circuit and a coordinated potential difference of the circuit on the occurrence of a predetermined phase relationship between the current and potential difference.

3. For use in the protection of alternating electric current systems a biasing transformer with restraining and operating windings so arranged in relation to the magnetic circuit that the secondary current is related in phase but not in magnitude with the exciting current.

4. Protective apparatus for alternating electric current systems comprising a relay current and potential transformers, two biasing transformers having operating and restraining windings in series relation with said current and potential transformers, the secondary current of both biasing transformers being effective on the relay.

5. Protective apparatus for alternating electric current systems as claimed in claim 4, in which the potential biasing transformer is excited by a potential difference in quadrature to the potential difference giving rise to current in the protected circuit.

6. Protective apparatus for alternating electric current systems comprising a relay, current and potential transformers, two biasing transformers, one having operating and restraining windings arranged to be energized by the current transformer and the other having operating and restraining windings arranged to be energized by the potential transformer, the secondaries of said biasing transformers being arranged to control the relay in accordance with the phase relationship of the current and potential in the secondaries of the current and potential transformers, and means for compensating for inherent variations in the phase relationship of the current and potential.

7. Protective apparatus for alternating electric current systems comprising a relay current and potential transformers, the potential transformer being connected to yield a potential difference in quadrature with the potential difference giving rise to current in the current transformer, a biasing transformer having restraining and operating windings arranged to be energized by the current transformer and adjusted to yield a secondary current insufficient to operate the relay and approximately constant in magnitude independent of the magnitude of the primary current in the circuit protected, and another biasing transformer having operating and restraining windings arranged to be energized by the potential transformer, the secondary windings of both biasing transformers being connected in opposite senses in the circuit of the relay so that operation of the relay is effected by a reversal of power in the circuit.

8. In a protective arrangement for parallel alternating current circuits, means comprising a relay arranged to control one of the circuits, current transformers, one for each circuit, having their secondaries interconnected normally for circulating current, a potential transformer in the circuit controlled by the relay, a biasing transformer having operating and restraining windings connected in series across normally equipotential points of the circuit interconnecting the current transformer secondaries and another biasing transformer having operating and restraining windings connected in series across the secondary of the potential transformer, the secondary windings of the biasing transformer being connected to effect operation of the relay on the occurrence of a reversal of power in the circuit controlled by the relay.

9. A protective apparatus for alternating electric current systems comprising a relay, current and potential transformers, and two biasing transformers, one having operating and restraining windings arranged to be energized by the current transformer and the other having operating and restraining windings arranged to be energized by the potential transformer, the secondaries of said biasing transformers being arranged to control the relay in accordance with the phase relationship of the current and potential in the secondaries of the current and potential transformers.

10. Protective apparatus for a three-phase alternating current system having parallel circuits comprising a relay, a current biasing transformer having operating and restraining windings in series connected to be energized in accordance with the difference between the currents in corresponding conductors of the circuits, and a potential biasing transformer having operating and restraining windings in series connected to be energized by a potential difference of the system normally in quadrature with the current in said corresponding conductors, the secondary windings of the biasing transformers being connected and arranged to control the operation of the relay in accordance with the phase relationship between said difference current and said potential difference.

11. A protective system for an alternating current circuit comprising a relay and means for effecting operation of the relay in accordance with a predetermined phase relationship between current in the circuit and a predetermined potential difference of the circuit comprising a biasing transformer having an operating winding arranged to be energized by said potential difference.

12. In a protective system for a three-phase alternating current circuit, a relay, a current biasing transformer having operating and restraining windings connected in series and in series relation with one phase conductor of the circuit, and a potential biasing transformer having operating and restraining windings connected in series and arranged to be energized in accordance with the potential difference between the other two phase conductors of the circuit, the secondary windings of said biasing transformers being arranged to oppose each other with power flow in one direction in the circuit and to assist each other and thereby effect operation of said relay with power flow in the opposite direction.

In witness whereof, I have hereunto set my hand, this 9th day of July, 1923.

ALAN STEWART FITZ GERALD.